United States Patent [19]

Watakabe

[11] 4,184,008

[45] Jan. 15, 1980

[54] FLOAT TYPE METAL-AIR BATTERY

[76] Inventor: Yuichi Watakabe, Tennocho-danchi 2-1220, No. 42-2, 2-chome, Tenno-cho, Hodogaya-ku, Yokohama-shi, Kanagawa-ken, Japan

[21] Appl. No.: 891,332

[22] Filed: Mar. 29, 1978

[30] Foreign Application Priority Data

Apr. 4, 1977 [JP] Japan ............................ 52/40953[U]

[51] Int. Cl.² ...................... H01M 6/34; H01M 12/06
[52] U.S. Cl. ........................................ 429/27; 429/119; 9/8.3 E
[58] Field of Search ...................... 362/157, 158, 194; 429/27, 28, 29, 119; 9/8.3 E

[56] References Cited

U.S. PATENT DOCUMENTS

| | | | |
|---|---|---|---|
| 2,907,809 | 10/1959 | Southworth et al. | 429/27 |
| 3,682,706 | 8/1972 | Yardney et al. | 429/27 |
| 3,914,813 | 10/1975 | Berchielli et al. | 9/8.3 E |

*Primary Examiner*—Donald L. Walton
*Attorney, Agent, or Firm*—Pope, Ballard, Shepard & Fowle

[57] ABSTRACT

A float type metal-air battery having an air chamber positioned at the center thereof, a weight positioned at the center bottom thereof, two electrolyte chambers positioned on both sides of the air chamber, and two cells positioned on both sides of the air chamber, so that the battery is improved in balance and is facilitated in manufacture.

5 Claims, 5 Drawing Figures

FLOAT TYPE METAL-AIR BATTERY

This invention relates to a metal-air battery used by being floated especially on the sea surface or the like, and more in detail is directed to a float type metal-air battery operable by being floated on the sea water, fresh water or the like and suitable in use as a drifting beacon light by lightening a lamp connected thereof.

The conventional battery of this kind is such a type that an air chamber is provided for each cell, so that the battery is so defective that the same requires a lot of constructional members or components and is troublesome in manufacturing thereof. Further, the battery is so designed that buoyancy is brought about by air chambers formed on one side of the interior of a battery container and the battery tends to incline toward sea water chambers, and consequently the same is so defective that the same must be manufactured especially by considering size of a weight, its position to be attached thereto and so on and thus it is difficult in manufacture and actual use thereof.

This invention has for its object to provide a float type metal-air battery being free from those defects and simple in assembling work and obtained simply and well balance without special consideration, and according to this invention, it is characterized in that a float type metal-air battery has an inner container 1 of which the interior serves as an air chamber 2 being in communication with the exterior air and two cathode plates 3, 3 are attached to the opposite surfaces of the inner container 1 and the inner container 1 is placed in an outer container 4 so as to be positioned at the center of the outer container 4, and anode plates are provided respectively outside the respective cathode plates so that they may face each other on each side for forming cells a, a, on both sides and, both side spaces between the inner container 1 and the outer container 4 serve as electrolyte chambers 6, 6 being in communication with the outside, and both the cells a, a are connected by conducting wire 7 and a weight is attached to the bottom surface of the central inner chamber 1.

One embodying example of this invention will now be explained with reference to the accompanying drawings.

BRIEF DESCRIPTION OF DRAWINGS

In the accompanying drawings forming a part of the specification, and in which like numerals are employed to designate like parts throughout the same.

DETAILED DESCRIPTION

Figure 1:
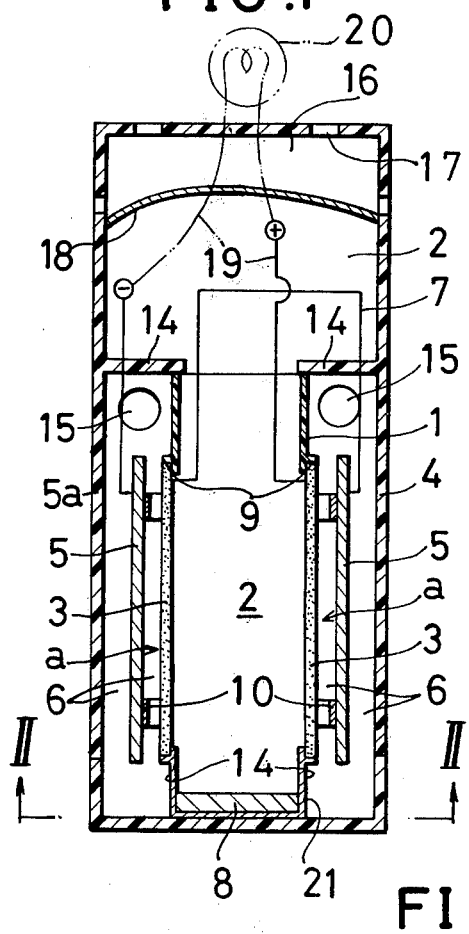
FIG. 1 is a vertically sectional view of one embodying example of this invention.
Figure 3:
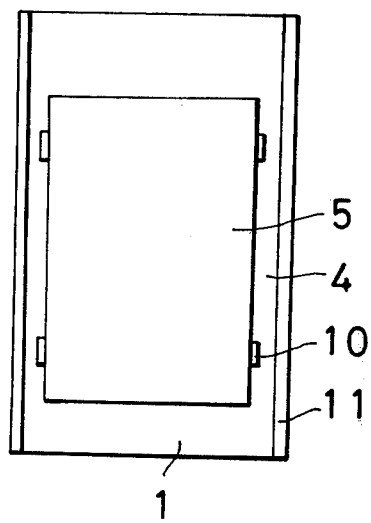
FIG. 3 is a front view of an inner container.
Figure 2:
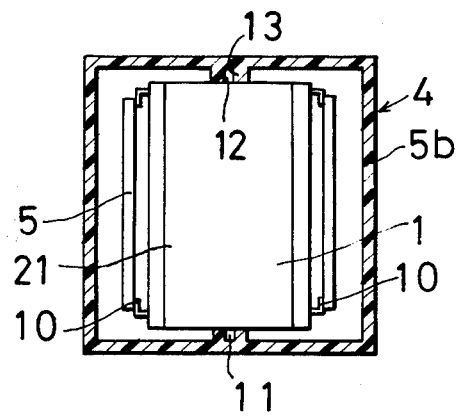
FIG. 2 is a sectional view, taken along the line II—II in FIG. 1 of the same.
Figure 4:
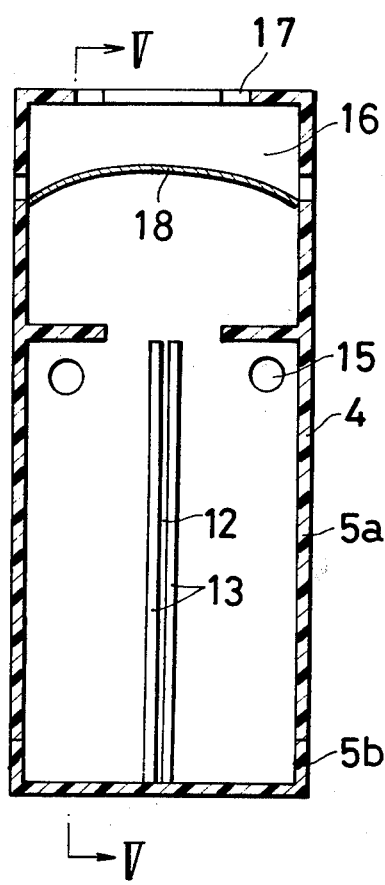
FIG. 4 is a vertically sectional view of an outer container.
Figure 5:
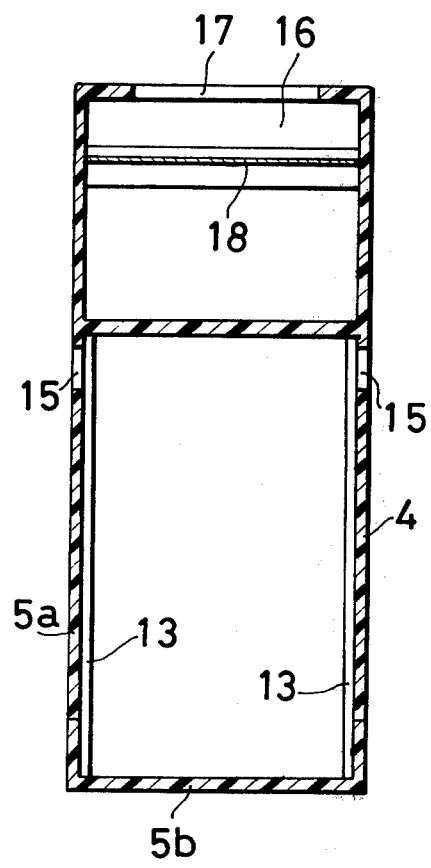
FIG. 5 is a sectional view, taken along the line II—II in FIG. 4.

Referring to the drawings, numeral 1 of an inner container of a float type metal-air battery, and the inner container 1 is composed of a top-opened rectangular frame body made of hard and transparent synthetic resin, and the interior thereof is formed to serve as an air chamber 2, and the inner container 1 is at its both side walls provided with window openings 15, 15 in which cathode plates 3, 3, each comprising carbon or the like, are mounted and are adhered thereto air-and-liquid tightly. Anode plates 5, 5 each comprising a magnesium plate or the like are disposed respectively outside the cathode plates 3, 3 so as to face the same, respectively. Anode plates 5, 5 each comprising a magnesium plate or the like are disposed respectively outside the cathode plates 3, 3 so as to face the same. A preferable means for achieving this is such that on the outer surfaces of both the side walls of the inner container 1 and on both side edges of each window opening 9 two supporting projections 10, 10 are provided above and below and each anode plate 5 is attached by adhesive to those projections 10, 10 . . . for being supported thereby, so that there is formed between the cathode plate 3 and the anode plate 5 a space for introducing sea water and thus all the side surfaces of the anode plate 5 are brought into contact with sea water. The inner container thus provided with those pairs of the cathode and anode plates 3, 3, 5, 5 is mounted in an outer container 4 so as to be positioned at the center of the outer container. For achieving this, it is so arranged that the outer surfaces of the other both side walls of the inner container 1 have, along the center line thereof, engaging ribs 11, 11 respectively projecting therefrom, and, on the other hand, the inner surfaces of both the corresponding or facing side walls of the outer container 4 have along the center line thereof, engaging grooves 12, 12 for receiving the above ribs 11, 11, respectively. Thus, the inner container 1 can be positioned automatically at the center of the outer container 4 by inserting both the engaging ribs 11, 11 into the engaging grooves 12, 12 of the outer container 4. A weight 8 is adhered and fixed to the inner surface of the bottom wall of the inner container 1 before the inner container 1 is placed into the outer container 4. The outer container 4 is a frame body made of the same material as the inner container 1 and comprises a main body 5a and a bottom covering body 5b which is to be secured liquid-tight to the lower end of the main body 5a after the inner container 1 is mounted therein. Each engaging groove 12 is formed by two spaced ribs 13, 13. The outer container 4 has further at its inner surface, and in its middle portion right and left partition walls 14, 14 for serving to restrict the insertion degree of the inner container 1, so that the upper end of the inner container 1 inserted thereinto may abut the partition walls 14, 14 and also may be fixed thereto by adhesive, air and liquid tightly. Thus, below the partition walls there is formed both side compartment chambers 6, 6 for serving as sea water chambers 6, 6 air and liquid tightly isolated from the air chamber 2. Numeral 15 denotes a sea water inflowing hole made in such upper and side portions of the outer container 4 that are above the cells so as to be in communication with each of the foregoing sea water chambers 6, 6. The air chamber 2 is in communication with the external air through the upper space 16 of the outer container 4, and through air intake openings 17 made in the top wall and the upper side wall of the outer container 4. Numeral 18 denotes a water repellent sheet or membrane covering the air chamber 2 and preventing sea water from going into the same but permitting the air to go into the same. Numeral 19 denote conducting wires led out from the cells a, a, and connecting to an electric lamp 20 mounted in the top outer surface of the outer container 4. Numeral 21 denotes a carrier frame air tightly adhered to the lower end of the inner container 1 for carrying the weight 8 therein.

The foregoing battery thus constructed according to this invention is so arranged that the air chamber 1 and the weight 8 may be positioned at the center of the same and the cells a, a, each comprising a pair of the anode plate and the cathode plate, and the sea water chambers 6, 6 may be positioned at both sides thereof, and accordingly the same is very well in balance, and the top surfaces of the electrolyte chambers 6, 6 are closed by the partition walls 14, 14 and also are provided at their upper and side portions with the sea water inflowing holes 15, 15, so that the partition walls 14, 14 prevent sea water or fresh water flown into the chambers 6, 6 can be kept always constant and consequently the battery can be always kept very well in balance, and additionally the electrolyte in the chambers 6, 6 cannot be easily flown out and at the same time cannot be diluted by fresh water flown into the chambers 6, 6, through the holes 15, 15, and salt concentration of the electrolyte can be kept well constant and consequently a desired electric voltage of the battery can be obtained for a long time. Thus, due to the above construction of this invention battery, immediately after the same is thrown at the sea water or fresh water surface at the time of use thereof, the same is restored to become upright and it can be prevented that the water enters the air chamber 2 and thus a high stable and retirable battery can be secured for a long time of use.

Also, as mentioned above, the cells a, a are constructed by attaching the cathode and anode plates 3, 3, and 5, 5 to the inner container 1, so that manufacturing of the battery can be facilitated and also the anode plate 5 is attached to the supporting projections 10, so that the same is spaced from the cathode plate 3 and can be wholly exposed to the sea water and a good operation of the battery can be resulted.

Alternatively, it may be considered that the anode plates 5, 5 are attached to the inner surfaces of both the side walls of the outer container 4. Also, as occasion demands, an additional pair of cells may be provided on other both sides of the battery container.

In case the battery is used by floating on the fresh water such as of a lake, any salt serving as electrolyte preferably, sodium chloride is previously provided in the sea water chambers 6, 6.

Thus, according to this invention, an air chamber 2 is provided at the center of the battery container and also a weight 8 is provided at the center and lower portion thereof and cells a, a, each comprising a pair of anode and cathode plates and a sea water chamber 6, which are common to the air chamber 2, are disposed at both sides thereof, and consequently assembling work of the battery can be facilitated and a well-balanced and high reliable float type metal-air battery can be obtained.

What is claimed is:

1. A float type metal-air battery comprising:
   a box-like outer frame unit having pairs of opposed side walls, a top wall, an open bottom, and an interior partition wall disposed in spaced parallel relation to the top wall to define an upper air chamber therebetween, said partition wall having a central opening, a box-like inner frame unit having pairs of opposed side walls, a bottom wall and an open top, said inner frame unit interiorly defining a central air chamber, means for removably supporting said inner frame unit within said outer frame unit with said central opening aligned with said open top and with corresponding opposed side walls of the inner and outer frame units in spaced-apart relation to define water chamber regions therebetween, electrolyte cell means including anode and cathode plates disposed in said water chamber regions, a pair of opposed side walls of the inner frame unit each having an opening with one of said plates sealed air and liquid tightly therein in window-like fashion, means supporting the other of said plates in spaced parallel relation therewith, and
   bottom cover means for said outer frame unit to enclose the inner frame unit therein, at least some of the walls of said outer frame unit having openings below said partition wall for enabling circulatory flow of water to said water chamber regions, and having openings above said partition for enabling circulatory flow of air to the air chambers.

2. A float type metal-air battery in accordance with claim 1 wherein said openings below said partition wall are located adjacent the upper end of said water chamber regions in relative close proximity to said partition wall.

3. A float type metal-air battery in accordance with claim 1 and further including an air pervious water repellent membrane extending between said central opening of said partition wall and said openings above said partition.

4. A float type metal-air battery in accordance with claim 1 and further including a weight disposed at the bottom of said inner frame unit.

5. A float type metal-air battery in accordance with claim 4 and further including an air pervious water repellent membrane extending between said central opening of said partition wall and said opening above said partition and wherein said openings below said partition wall are located adjacent the upper end of said water chamber regions in relative close proximity to said partition wall.

* * * * *

UNITED STATES PATENT AND TRADEMARK OFFICE
CERTIFICATE OF CORRECTION

PATENT NO. : 4,184,008
DATED : January 15, 1980
INVENTOR(S) : Yuichi Watakabe

It is certified that error appears in the above-identified patent and that said Letters Patent are hereby corrected as shown below:

Assignee: Furukawa Denchi Kabushiki Kaisha, Yokohama, Japan

Signed and Sealed this

Thirteenth Day of May 1980

[SEAL]

Attest:

SIDNEY A. DIAMOND

Attesting Officer

Commissioner of Patents and Trademarks